US012104416B2

(12) United States Patent
Inan et al.

(10) Patent No.: US 12,104,416 B2
(45) Date of Patent: Oct. 1, 2024

(54) MOTOR VEHICLE DOOR LOCK

(71) Applicant: Kiekert AG, Heiligenhaus (DE)

(72) Inventors: Ömer Inan, Dorsten (DE); Holger Schiffer, Meerbusch (DE); Thomas Schönenberg, Burscheid (DE); Michael Scholz, Essen (DE); Thorsten Bendel, Oberhausen (DE)

(73) Assignee: Kiekert AG, Heiligenhaus (DE)

( * ) Notice: Subject to any disclaimer, the term of this patent is extended or adjusted under 35 U.S.C. 154(b) by 335 days.

(21) Appl. No.: 17/623,292

(22) PCT Filed: Jun. 25, 2020

(86) PCT No.: PCT/DE2020/100545
§ 371 (c)(1),
(2) Date: Dec. 28, 2021

(87) PCT Pub. No.: WO2021/000992
PCT Pub. Date: Jan. 7, 2021

(65) Prior Publication Data

US 2022/0364396 A1 Nov. 17, 2022

(30) Foreign Application Priority Data

Jul. 1, 2019 (DE) ..................... 10 2019 117 677.8

(51) Int. Cl.
*E05B 81/90* (2014.01)
*E05B 81/04* (2014.01)
(Continued)

(52) U.S. Cl.
CPC ............. *E05B 81/90* (2013.01); *E05B 81/04* (2013.01); *E05B 81/16* (2013.01); *E05B 85/02* (2013.01)

(58) Field of Classification Search
CPC .......... E05B 81/90; E05B 81/04; E05B 81/16; E05B 85/02
See application file for complete search history.

(56) References Cited

U.S. PATENT DOCUMENTS 5,445,326 A 8/1995 Ferro et al.
9,121,202 B2 * 9/2015 Burciaga ................. E05B 77/32
(Continued)

FOREIGN PATENT DOCUMENTS

DE 20312347 U1 10/2003
DE 102015004985 A1 12/2015
(Continued)

OTHER PUBLICATIONS

International Search Report mailed Sep. 11, 2020, for priority International Patent Application No. PCT/DE2020/100545.

*Primary Examiner* — Mark A Williams
(74) *Attorney, Agent, or Firm* — Renner, Otto, Boisselle & Sklar, LLP

(57) ABSTRACT

The invention relates to a motor vehicle door lock which is equipped with a locking mechanism (1, 2) that consists essentially of a rotary latch (1) and a pawl (2). Furthermore, an electrical drive (3, 4) for the locking mechanism (1, 2) is provided. Moreover, an actuating lever chain (5, 6, 7) is implemented between the electrical drive (3, 4) and the locking mechanism (1, 2), wherein a coupling element (7) of the actuating lever chain (5, 6, 7) can at least be decoupled with the aid of an emergency actuating element (9, 10) that can be acted on manually. According to the invention, the emergency actuating element (9, 10) acts on the coupling element (7) predominantly in a linear manner in relation to a link (8).

13 Claims, 1 Drawing Sheet

(51) Int. Cl.

| | |
|---|---|
| ***E05B 81/16*** | (2014.01) |
| ***E05B 85/02*** | (2014.01) |

(56) References Cited

U.S. PATENT DOCUMENTS

| | | | |
|---|---|---|---|
| 2018/0058112 | A1 | 3/2018 | Okuma |
| 2019/0106914 | A1 | 4/2019 | Tamura et al. |

FOREIGN PATENT DOCUMENTS

| | | | |
|---|---|---|---|
| DE | 102017123262 | | 4/2019 |
| DE | 102017124523 | A1 | 4/2019 |
| DE | 102017124531 | A1 | 4/2019 |

* cited by examiner

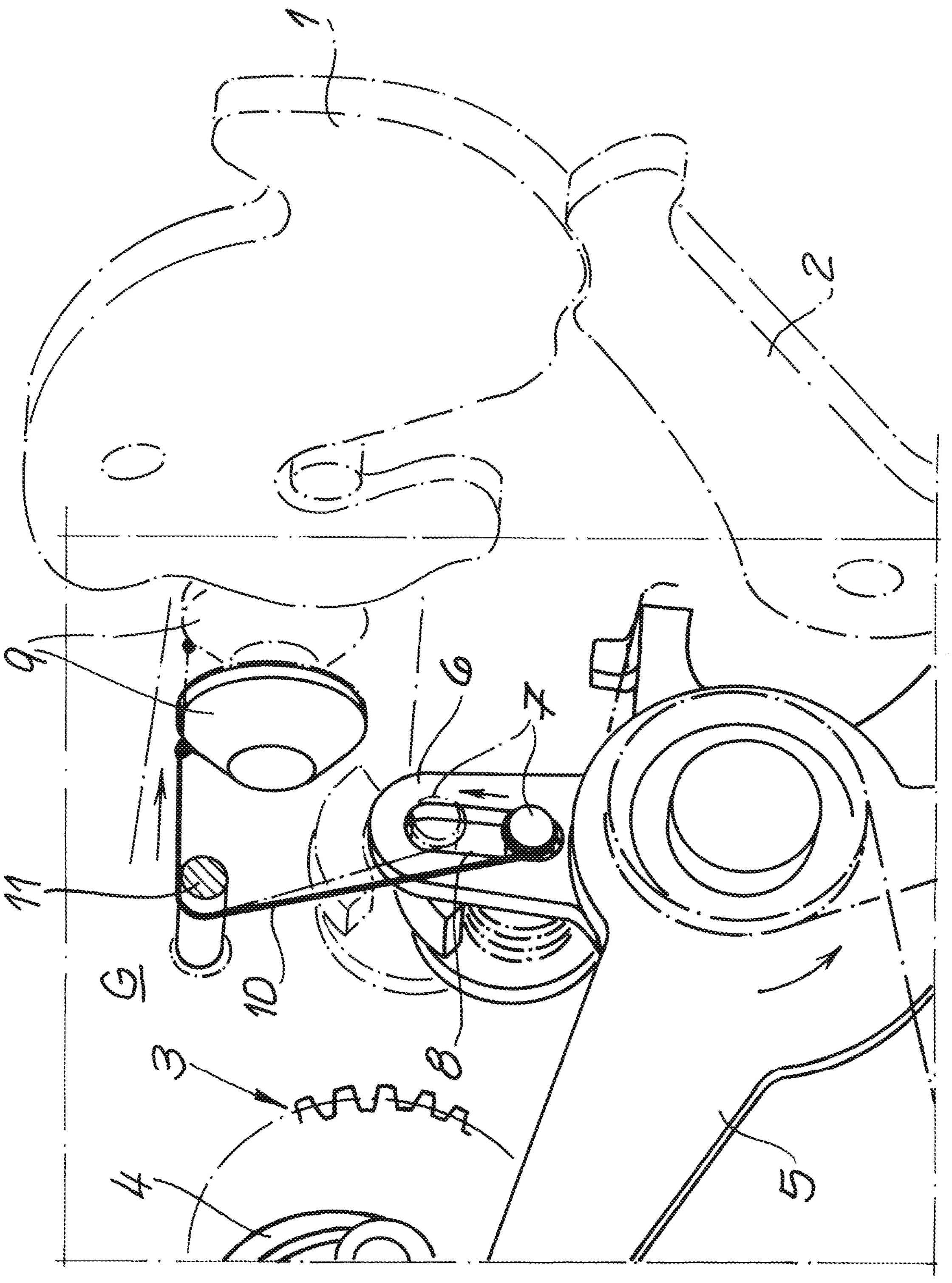
1
2
9
6
7
11
G
10
3
8
4
5

MOTOR VEHICLE DOOR LOCK

This application is a national phase of International Application No. PCT/DE2020/100545 filed Jun. 25, 2020, which claims priority to German Patent Application No. 10 2019 117 677.8 filed Jul. 1, 2019, the entire disclosures of which are hereby incorporated by reference.

FIELD OF DISCLOSURE

The invention relates to a motor vehicle door lock which is equipped with a locking mechanism that consists essentially of a rotary latch and a pawl, furthermore with an electric or electromotive drive for the locking mechanism, and with an actuating lever chain that is implemented between the electric drive and the locking mechanism, wherein a coupling element of the actuating lever chain can at least be decoupled with the aid of an emergency actuating element that can be acted on manually.

BACKGROUND OF DISCLOSURE

As usual, the motor vehicle door lock or the locking mechanism thereof interacts with a locking bolt on a motor vehicle body as soon as an associated motor vehicle door, motor vehicle tailgate or the like that accommodates the motor vehicle door lock is closed. For this purpose, the motor vehicle door lock is usually arranged in or on the motor vehicle door in question. In contrast, the locking bolt is located on the body, for example on a B or C pillar.

Motor vehicle door locks with an electric or electromotive drive for the locking mechanism are known in practice in a variety of designs. The electric drive is usually responsible for opening the locking mechanism. In addition, the locking mechanism can basically also be opened mechanically for reasons of redundancy. This can take place, for example, via an internal actuating lever. In contrast, a sensor acted on by the external door handle usually ensures that the electric drive is activated.

In the case of electric drives and, in particular, opening drives for the locking mechanism with an actuating lever chain between the electric drive in question and the locking mechanism, the problem can arise in practice that the drive cannot, or can no longer, be brought into its normal position, for example after an electrical opening process. This may be caused by the complete or partial failure of the electrical power supply of the electric drive. Alternatively or additionally, however, it is also quite simply possible that the actuating lever chain is unintentionally blocked mechanically.

In both cases, this means that the pawl, as part of the locking mechanism, remains lifted out of the rotary latch and the pawl and can no longer fall into the rotary latch in a locking or latching manner. As a result, the rotary latch also remains open and the locking mechanism cannot (can no longer) be closed in this case. This is because the pawl, due to its raised position, is not able to fall into the rotary latch during the closing process.

In the generic state of the art according to DE 10 2017 124 531 A1, it is provided overall for this purpose that the emergency actuating element is arranged on the lock side in an accessible area, for example in the inlet mouth. As a result, emergency locking can be implemented in a simple manner with little effort, taking into account a structurally simple design with, at the same time, manual actuation. In the course of this manual emergency locking, in the state of the art according to DE 10 2017 124 531 A1 the emergency actuating element ensures in detail that a coupling lever as part of the actuating lever chain is transferred into its “decoupled” position. As a result, the actuating lever chain is mechanically interrupted, so that the pawl is no longer held in the position where it is lifted from the rotary latch, but can snap unhindered in a latching manner into the rotary latch for the aforementioned emergency locking when the associated motor vehicle door is closed. This has proven itself in principle.

However, the generic solution according to DE 10 2017 124 531 A1 uses a special emergency actuating element with an eccentric for this purpose. Such an embodiment requires additional separate production and assembly, which offers potential cost savings.

In the further state of the art according to U.S. Pat. No. 5,445,326, solutions are presented in which a locking pawl can be acted on directly or indirectly with the aid of a cable pull. However, such a solution cannot be transferred to a motor vehicle door lock with an electric drive or opening drive.

In another largely generic teaching corresponding to US 2019/0106914 A1, the procedure is such that an opening lever can be acted on by an additional emergency actuating handle. This solution is also structurally complex.

This also applies to the motor vehicle door lock that has become known from DE 10 2017 123 262 A1. This is because a mechanical actuating element is provided here for emergency actuation of the drive element, which for this purpose acts radially on the drive element of the electric drive for rotation thereof. For this purpose, the drive element and the actuating element are each equipped with a gear. In normal operation, the two gears do not mesh with one another, but are only brought into engagement with one another for emergency actuation.

SUMMARY OF DISCLOSURE

The invention is based on the technical problem of further developing such a motor vehicle door lock in such a way that a structurally simple, functionally reliable and cost-effective solution is made available.

To solve this technical problem, within the scope of the invention a generic motor vehicle door lock is characterized in that the emergency actuating element acts on the coupling element predominantly linearly with respect to a link.

A further advantageous procedure here is that, by pulling or pushing, the emergency actuating element transfers the coupling element from its consistently assumed “coupled” position to the “decoupled” state. In addition, the design is usually such that the emergency actuating element selectively engages a pin of the coupling element that is guided in the link. The link itself is regularly provided on a release lever.

According to a particularly advantageous embodiment, two release levers that are mechanically connected to one another by the coupling element in the coupled state and separated from one another in the decoupled state are generally implemented. The two release levers can be mounted on the same axis throughout, namely on an associated lock housing, which basically has a lock cover and a lock case for mounting the locking mechanism.

The emergency actuating element, for its part, can be formed particularly simply and inexpensively due to this special design. This is because the coupling element mostly assumes its “coupled” basic position. In this “coupled” position, the coupling element ensures that the two release levers are mechanically connected to one another. As a result, when the actuating lever chain is acted on with the aid of the electric drive, the locking mechanism can be opened as desired with the aid of the actuating lever chain that is mechanically closed in this way. For this purpose, the actuating lever chain in question generally works on the pawl and lifts it out of its engagement with the rotary latch, so that the rotary latch can open with the assistance of a spring and releases the previously mentioned locking bolt. The motor vehicle door can then be opened immediately.

However, if there is an emergency actuation or an emergency locking, this corresponds to the fact that the electric drive has not been transferred to its normal position after such an opening process in normal operation or the actuating lever chain has a mechanical blockage. In both cases, with the aid of the emergency actuating element, the coupling element can now be transferred from its consistently assumed coupled state to the decoupled state. As a result, the two release levers are separated from one another and the pawl is no longer held in the lifted position. As a result, the motor vehicle door lock can be closed without problems by the locking bolt moving into the rotary latch and pivoting the rotary latch so that the pawl sliding along the rotary latch can then engage with the rotary latch.

The predominantly linear action on the coupling element with the aid of the emergency actuating element opens up the advantageous possibility of designing the emergency actuating element as an external tool. For this purpose, this external tool can pass through a separable opening in the lock housing for interaction with the coupling element, in particular it can act on the coupling element for linear action of the emergency actuating element. In this context, it has proven particularly useful if the emergency actuating element is designed as a component part of the vehicle. The separable opening may be designed as a plastics film with a reduced material thickness compared to the lock housing made of plastics material.

Consequently, in such a case and in the case of an emergency actuating element designed as a component part of the vehicle, additional external tools etc., which experience has shown are not available in an emergency or are unknown to a vehicle operator, are not required. In contrast, the component part of the motor vehicle is immediately available as an emergency actuating element and can be used intuitively by an operator for emergency actuation and, in particular, emergency locking. Such a motor vehicle component may be a motor vehicle key or the key bit thereof, a screwdriver as part of the on-board tool kit, a rod also as part of the on-board tool kit, etc. In principle, however, the emergency actuation or emergency locking can also be carried out in this case, for example, with a pin, for example a ball pin, or, if necessary, a pair of scissors, etc. In any case, there are various possibilities in emergency operation for an operator to advantageously implement an emergency locking in order to be able to lock the associated motor vehicle door and thus the motor vehicle as a whole. Otherwise there is an immediate risk that the opened motor vehicle will be stolen.

According to an alternative and further advantageous embodiment, the emergency actuating element can be designed as a closure which covers an opening in the lock housing and has a connected flexible actuating element. In this context, it has proven useful if the closure and the actuating element are designed in one piece, for example as a plastics molded part. The closure may be a closing plug for the opening in the lock housing. The connected flexible actuating element can be designed as a plastics cable molded onto the closing plug.

The closing plug in question can be easily removed from the lock housing by an operator in the event of an emergency actuation or emergency locking, so that during this process the coupling element acted on by the flexible actuating element is at the same time automatically transferred from its assumed "coupled in" position into the "decoupled" state. As an alternative to this, however, it is also possible for the closure or closing plug to be automatically pushed out of the opening in the event of emergency operation, for example by a spring, so that in this case the operator does not need to remove the closure separately from the opening.

In both cases, a particularly simple and inexpensive emergency actuating element is available by which, in contrast to the generic state of the art according to DE 10 2017 124 531 A1, the additional production and the installation of an eccentric as described there is rendered superfluous. At the same time, the desired functional reliability is provided, so that overall considerable cost advantages can be expected. Herein lie the essential advantages.

BRIEF DESCRIPTION OF DRAWINGS

The invention is explained in greater detail below with reference to drawings, which show only one exemplary embodiment. The single FIGURE shows the motor vehicle door lock according to the invention schematically and in perspective, reduced to the components which are essential for the invention.

DETAILED DESCRIPTION

The single FIGURE shows a motor vehicle door lock which, in its basic structure, has a locking mechanism 1, 2 consisting essentially of a rotary latch 1 and a pawl 2. The locking mechanism 1, 2 is only indicated in the FIGURE. This also applies to an electromotive drive 3, 4 for the locking mechanism 1, 2, of which only an output-side gear 3 with a cam 4 can be seen in the FIGURE. The gear 3 with the cam 4 is driven by an electric motor, not shown.

The electric or electromotive drive 3, 4 works to open the locking mechanism 1, 2 on two release levers 5, 6, which are mounted coaxially with one another in a lock housing G made of plastics material, which is not specified in more detail. Moreover, a coupling element 7 is implemented, by which the two release levers 5, 6, of which essentially a pin engaging in a link 8 of the second release lever 6 can be seen, are mechanically connected to one another and separated.

If the coupling element 7 is in its "coupled" position, the two release levers 5, 6, i.e. the first release lever 5 and the second release lever 6, are mechanically connected to one another. Normal operation corresponds to this. In this case, acting on the drive 3, 4 leads to the first release lever 5 typically being pivoted in the counterclockwise direction indicated in FIG. 1, and in this case the second coupling lever 6 connected mechanically via the coupling element 7 is likewise entrained. The counterclockwise movement of the two release levers 5, 6 coupled to one another now has the consequence that the pawl 2, which engages in the rotary latch 1 in a latching manner in the closed state of the locking mechanism 1, 2, is lifted from its latching engagement. As a result of this, the rotary latch 1 can open with the assistance of a spring and can release a locking bolt, not shown in detail and described in the introduction to the description, usually with the assistance of a spring. Further details of this are described in the generic DE 10 2017 124 531 A1, which has a similar lock structure.

If the electric drive 3, 4 does not move, or does not move completely into its basic position or normal position shown in FIG. 1 according to the described opening process, this results in an actuating lever chain 5, 6, 7 formed from the two release levers 5, 6 and the coupling lever 7 remaining closed. In such a case, when normal operation is disrupted, this closed actuating lever chain 5, 6, 7 between the electric drive 3, 4 and the locking mechanism 1, 2 ensures that the pawl 2 is at least partially held or remains held in its lifted position relative to the rotary latch 1. As a result, in a subsequent closing process, the locking bolt can indeed move into an inlet mouth of the rotary latch 1, but in this case the pawl 2 is not able to interact with the rotary latch 1 in a latching manner. In this case the locking mechanism 1, 2 remains open and the associated motor vehicle door cannot be locked (manually).

In order nevertheless to provide a type of emergency locking or emergency actuation of the locking mechanism 1, 2 or the actuating lever chain 5, 6, 7, according to the exemplary embodiment an emergency actuating element 9, 10 that can be acted on manually is implemented. According to the invention, with the aid of the emergency actuating element 9, 10, the coupling element 7 can be acted on in a predominantly linear manner with respect to the link 8. In contrast, in the generic teaching according to DE 10 2017 124 531 A1, for example, the emergency actuating element is subjected to a rotating action, which works on the coupling element there via the eccentric.

In detail, according to the invention the emergency actuating element 9, 10 ensures that the coupling element 7 is acted on in a pulling manner. In this case, the coupling element 7 is transferred from its consistently assumed "coupled" position to the "decoupled" state. In addition, the design is such that the emergency actuating element 9, 10 optionally engages the already mentioned pin guided in the link 8 as an essential part of the coupling element 7. The link 8 is provided on a release lever 5, 6, specifically the second release lever 6.

The possibility of designing the emergency actuating element 9, 10 as an external tool is not shown. With the help of this external tool, a separable opening in the lock housing for interaction with the coupling element 7 can be pierced by an operator. In the exemplary embodiment, a variant is shown in which the emergency actuating element 9, 10 is designed as a closure 9 which covers an opening in the lock housing G and has an attached flexible actuating element 10. In fact, according to the exemplary embodiment, the closure 9 and the actuating element 10 are designed in one piece as a plastics molded part. That is, the closure 9 and the actuating element 10 can be produced and implemented jointly and particularly inexpensively in a plastics injection molding process. The flexible actuating element 10 may be a cable molded onto the closure 9.

As soon as the closure 9 covering the opening has been removed from the opening by an operator in the event of an emergency actuation, the operator in question can act (by pulling) on the coupling element 7 or the pin thereof via the flexible actuating element 10 connected to the closure 9. For this purpose, the flexible actuating element 10 can additionally be guided via a deflection 11 in the lock housing G, which of course is not mandatory.

List of reference signs

| | |
|---|---|
| 1, 2 | locking mechanism |
| 1 | rotary latch |
| 2 | locking mechanism |

-continued

List of reference signs

| | |
|---|---|
| 3, 4 | electromotive drive |
| 3 | gear |
| 4 | cam |
| 5, 6, 7 | actuating lever chain |
| 5, 6 | release lever |
| 5 | first release lever |
| 6 | second release lever |
| 7 | coupling element |
| 8 | link |
| 9, 10 | emergency actuating element |
| 9 | closure |
| 10 | actuating element |
| 11 | deflection |
| G | lock housing |

The invention claimed is:

1. A motor vehicle door lock comprising:

a locking mechanism that includes a rotary latch and a pawl, an electric drive for operating the locking mechanism, and an actuating lever chain that is implemented between the electric drive and the locking mechanism to selectively couple the electric drive and the pawl of the locking mechanism, wherein the actuating lever chain includes a coupling element and a link through which the coupling element is moveable from a consistently assumed coupled position in which the electric drive and the pawl are coupled to a decoupled position in which the electric drive and the pawl are decoupled with the aid of a manually actuatable emergency actuating element, wherein the emergency actuating element acts on the coupling element by moving a portion of the coupling element through the link, and wherein the coupling element includes a pin, and the emergency actuating element engages the pin of the coupling element and guides the pin through a slot within the link to move the pin between the coupled position and the decoupled position.

2. The motor vehicle door lock according to claim 1, wherein, by pulling or pushing, the emergency actuating element transfers the coupling element from the consistently assumed coupled position to the decoupled position.

3. The motor vehicle door lock according to claim 1, wherein the actuating lever chain includes a release lever, and the link is provided on the release lever.

4. The motor vehicle door lock according to claim 1, wherein the actuating lever chain includes first and second release levers that are mechanically connected to one another by the coupling element in the coupled position and separated from one another in the decoupled position.

5. The motor vehicle door lock according to claim 4, wherein the first and second release levers are mounted on a same axis, wherein the link is provided on the second release lever.

6. The motor vehicle door lock according to claim 1 further comprising a lock housing that houses at least a portion of the locking mechanism, wherein the emergency actuating element passes through an opening in the lock housing for interaction with the coupling element.

7. The motor vehicle door lock according to claim 1 further comprising a lock housing that houses at least a portion of the locking mechanism, wherein the emergency actuating element includes a closing plug covering an opening in the lock housing and a flexible actuating element attached at a first end to the closing plug and to the pin at a second end.

8. The motor vehicle door lock according to claim 7, wherein the closing plug and the flexible actuating element are formed in one piece.

9. The motor vehicle door lock according to claim 8, wherein the closing plug and the flexible actuating element are formed as a single plastic molded part.

10. The motor vehicle door lock according to claim 7, wherein the flexible actuating element is a plastic cable.

11. The motor vehicle door lock according to claim 10, wherein the emergency actuating element further includes a spring that acts on the closing plug.

12. The motor vehicle door lock according to claim 1, wherein the emergency actuating element acts on the coupling element by moving the coupling element linearly with respect to the link.

13. The motor vehicle door lock according to claim 7, wherein the lock housing further includes a deflection and the flexible actuating element extends around the deflection such that the flexible actuating element is guided by the deflection as the flexible actuating element acts on the pin.

* * * * *